United States Patent

[11] 3,584,277

| [72] | Inventor | Dan Teodorescu<br>Timisoara, Romania |
|---|---|---|
| [21] | Appl. No. | 810,497 |
| [22] | Filed | Mar. 26, 1969 |
| [45] | Patented | June 8, 1971 |
| [73] | Assignee | Ministerul Industriei Constructilor de Masini<br>Bucharest, Romania |
| [32] | Priority | Mar. 29, 1968 |
| [33] | | Romania |
| [31] | | 56288 |

[54] FERRORESONANT SERVOMOTOR WITH EXTERNAL FEEDBACK
5 Claims, 2 Drawing Figs.

[52] U.S. Cl. ............................................. 318/222, 318/225
[51] Int. Cl. .............................................. H02p 5/28
[50] Field of Search ................................... 318/138, 165, 166, 222, 225

[56] References Cited
UNITED STATES PATENTS

| 2,821,675 | 1/1958 | Ostenso et al. | 318/138X |
| 2,995,690 | 8/1961 | Lemon | 318/138 |
| 3,083,326 | 3/1963 | Deming et al. | 318/138 |
| 3,098,958 | 7/1963 | Katz | 318/138 |
| 3,229,178 | 1/1966 | Favre | 318/138 |
| 3,280,398 | 10/1966 | Marie | 318/166 |

Primary Examiner—Benjamin Dobeck
Assistant Examiner—Gene Z. Rubinson
Attorney—Karl F. Ross ABSTRACT: A squirrel-cage motor of the ferroresonant type, having two pairs of stator windings in series with respective tuning condensers energized in parallel from a source of alternating current, is provided with a feedback winding on each stator pole designed to aid or to oppose an applied control signal, all the feedback windings being connected in series across two branches of a phase-discriminating network extending from a common terminal to symmetrical taps on two parallel stator windings. Each branch includes a resistor in series with a diode, the two diodes being oppositely poled so that a voltage difference is generated across the feedback circuit upon a relative phase shift of the currents traversing the two pairs of stator windings. The common terminal is energized by an AC voltage in step with the supply voltage through a transformer or a resistive voltage divider.

PATENTED JUN 8 1971

3,584,277

Dan Teodorescu
INVENTOR.

BY

Karl F. Ross
Attorney

FERRORESONANT SERVOMOTOR WITH EXTERNAL FEEDBACK

My present invention relates to a servomotor of the ferroresonant type as used, for example, in systems for the automatic control of temperature, discharge rates, rotary speeds, or voltage.

Such servomotors generally have a stator with a plurality of poles arrayed about an axis and a short-circuited rotor centered on that axis for entrainment by a rotating electric field generated in the stator windings.

It is known to tune such stator windings with the aid of a series condenser to the frequency of a source of alternating driving current connected thereacross. If the pole carrying such a winding is biased so as to saturate during alternate half cycles, the inductance of the winding is altered with a resulting shift in the phase of the current traversing same. The superimposition of a control current modifies this bias and, with it, the resulting phase shift which may be used to determine the speed and sense of rotation of the rotor.

There is, however, no linear relationship between the change in rotor speed and the magnitude of the applied control signal. To linearize this relationship, prior system have utilized a corrective negative feedback from a tachometer driven by the rotor shaft.

An object of my invention is to provide simpler means for the realization of such linear relationship without the use of a conventional tachometer.

Another object is to provide means in such a servomotor for accelerating its response to an applied control signal.

My present improvement, designed to achieve either of the above objects, includes a phase-discriminating network having two branches interconnected between a common terminal and a pair of symmetrical taps on two primary stator windings energized in parallel from an alternating-current source while being resonated by respective series condensers; a feedback circuit includes respective coils on the poles carrying these stator windings, the coils being serially connected across the two branches of the phase discriminator so as to be energized in response to a relative phase shift in the currents traversing the two stator windings. The sense of current flow in the associated feedback coils is mutually inverted with reference to the two primary windings so as to aid in the magnetization of one pole while opposing the magnetizaion of the other.

More specifically, the common terminal is coupled to the source of driving current for energization at the operating frequency of that source, either by way of a transformer or through a resistive voltage divider. The potential difference between this common terminal and a common bus bar feeding the two stator windings is therefore an alternating voltage termed a reference voltage hereinafter.

Advantageously, each branch of the phase-discriminating network comprises a resistor in series with a diode, the two diodes being oppositely pole; the feedback circuit is connected between the junctions of these diodes with their associated resistors.

In view of the symmetry of this arrangement, no current will flow through the feedback circuit as long as the rotor is at standstill and no control signal is impressed upon the stator poles. The presence of such a control signal (with the rotor still stationary) results in a phase difference of about 10° to 15°. As the rotor begins to turn, this phase difference increases nonlinearly and may reach magnitudes of about 70° to 90°. Under these conditions the amplitude of the feedback current will depend on the rotor speed and, to a lesser extent, on the control signal; the polarity of this feedback current, however, is determined solely by the sign of the phase shift and therefore by the polarity of the control signal which also aids the instantaneous driving current in one stator winding while opposing it in the other.

If the output of the phase discriminator is applied to the stator poles in opposing relationship with the control signal, the feedback is negative and results in linearization. If the relationship is aiding, the feedback is positive and results in an accelerated response of the motor to the control signal.

The invention will be described in greater detail hereinafter with reference to the accompanying drawing in which.

Figure 1:
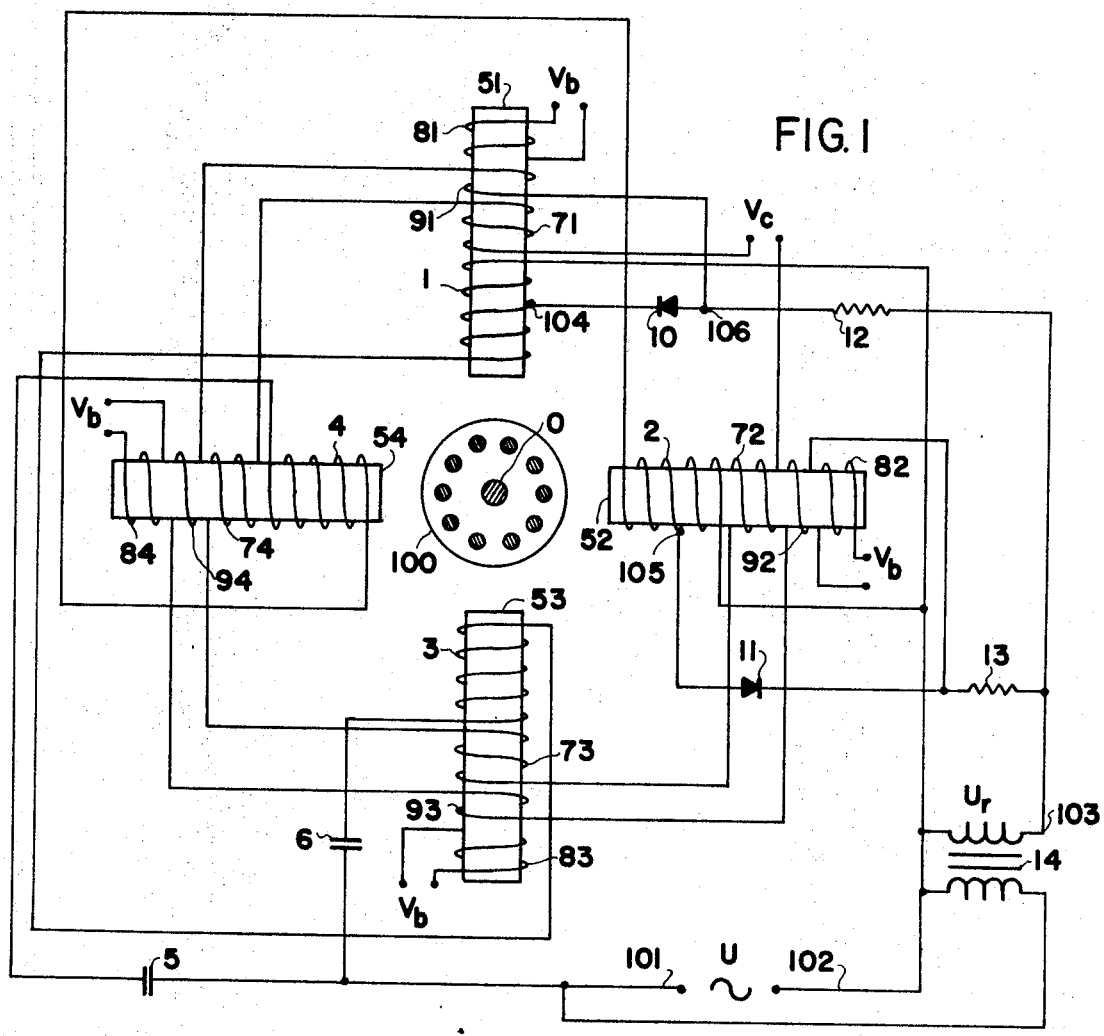
FIG. 1 is a circuit diagram of a servomotor embodying my invention.

In FIG. 1 I have shown a motor with a stator having four equispaced poles 51, 52, 53, 54 carrying respective primary winding 1, 2, 3, 4. Windings 2 and 4 are connected between two bus bars 101 and 102, energized from a source of AC driving voltage U, in series with a resonating capacitor 5; windings 1 and 3 are connected between the same bus bars in series with a similar capacitor 6. A rotor 100 of the well-known squirrel-cage type is rotatable about the stator axis 0.

Each pole further carries a control winding 71, 72, 73, 74 energizable by a signal voltage $V_c$; a biasing winding 81, 82, 83, 84 energizable by a voltage $V_b$ to generate a flux enabling periodic saturation of each pole by the driving current from bus bars 101, 102; and a feedback winding 91, 92, 93, 94 all connected in series between the junction 106 of a first diode 10 with a first resistor 12 and the junction 107 of a second diode 11 with a second resistor 13. Diode 10 and resistor 12 constitute one branch of a phase-discriminating network, this branch extending from a common terminal 103 to a tap 104 on winding 1; diode 11 and resistor 13 constitute another branch of this network connected between common terminal 103 and a tap 105 on winding 2 disposed symmetrically with reference to tap 104. The two diodes 10 and 11 are oppositely poled with reference to terminal 103.

Control coils 71 and 73, like feedback coils 91 and 93, are shown wound on poles 51 and 53 in the same sense as the associated primary windings 1 and 3; control coils 72 and 74, like feedback coils 92 and 94, are wound on their poles 52 and 54 in a sense opposite that of primary windings 2 and 4.

Terminal 103 is energized from voltage source U via a transformer 14 to generate a reference voltage $U_r$, the vector difference between this voltage and the voltage drop across the tapped-off portions of windings 1 and 2 representing the potentials of junctions 106 and 107, respectively. On standstill, with all the poles uniformly biased and with no control signal $V_c$ applied to coils 71—74, junctions 106 and 107 will have the same potential so that, with proper choice of the stepdown ratio of transformer 4, there will be no potential difference between junctions 106 and 107. The application of a control signal $V_c$, however, introduces a relative phase shift so that, depending on the sign of this phase shift, a feedback current will flow through coils 91—94 so as to further the magnetization of one pair of poles (e.g. 1 and 3) while opposing the magnetization of the other pole pair (e.g. 2 and 4) by their respective biasing windings. If the control signal $V_c$ has the same effect upon these poles, the feedback is positive; if the effect is contrary, the feedback is negative.

Figure 2:
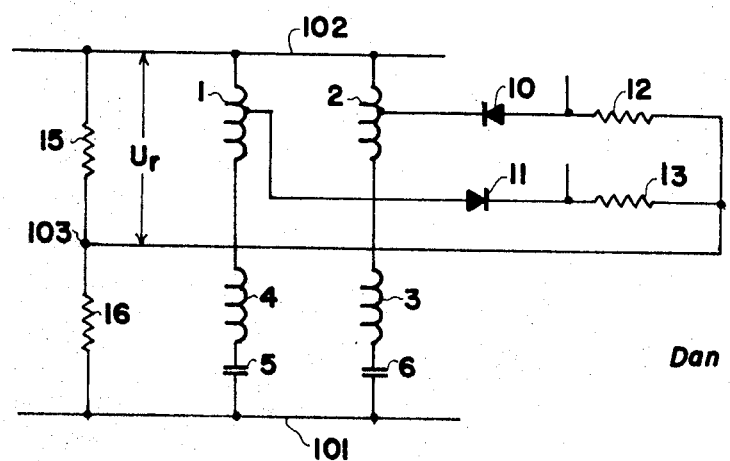
FIG. 2 is a partial diagram of a slightly modified servomotor.

FIG. 2 shows that the common terminal 103 may also be energized from bus bars 101 and 102 by means of a resistive voltage divider 15, 16 to generate the reference voltage $U_r$.

The feedback circuit including coils 91—94 may also comprise differential or integrating networks if the response of the motor to the control signal is to conform to a particular law. It will also be understood that auxiliary windings 71—74 and 91—94 could be combined into a single set of coils carrying both the control signal and the feedback current.

I claim:

1. A servomotor comprising a stator with a plurality of poles arrayed about an axis, a short-circuited rotor centered on said axis, a source of alternating driving current for said stator, first and second winding means on respective poles in series with respective tuning condensers connected in parallel across said source, a phase-discriminating network having two branches connected between a common terminal and a pair of symmetrical taps on said first and second winding means, and a feedback circuit including respective coils on said poles serially connected across said branches for energization in response to a relative phase shift in the currents traversing said first and second winding means, said coils being connected in mutually inverted relationship with said first and second winding means.

2. A servomotor as defined in claim 1 wherein each of said branches comprises a resistor and a diode in series, said diodes being oppositely poled, said feedback circuit being connected between respective junctions of said diodes with the associated resistors.

3. A servomotor as defined in claim 2 wherein said common terminal is coupled to said source for energization at the operating frequency thereof.

4. A servomotor as defined in claim 1 wherein each of said poles is further provided with an auxiliary winding for the application of a control signal in mutually inverted relationship with said first and second winding means.

5. A servomotor as defined in claim 1 wherein each of said poles is further provided with a biasing winding for energization by a magnetizing current enabling periodic saturation thereof by said driving current.